Figure 1:
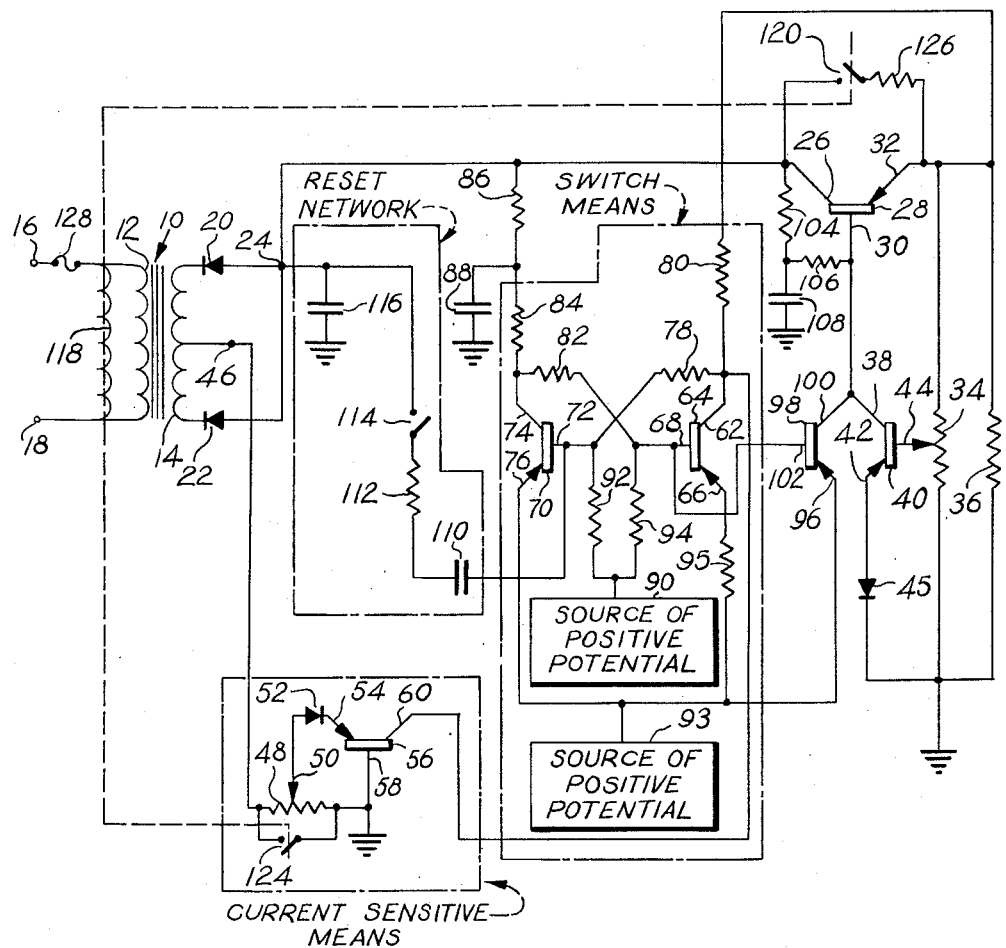

Aug. 28, 1962    L. J. MINTZ ET AL    3,051,852
TRANSISTORIZED CIRCUIT BREAKER NETWORK
Filed Nov. 19 1958    3 Sheets-Sheet 1

INVENTORS.
LEON J. MINTZ
ROLAND YII
BY Eli Weise

INVENTORS.
LEON J. MINTZ
ROLAND YII
BY Eli Weiss

United States Patent Office 3,051,852
Patented Aug. 28, 1962

3,051,852
TRANSISTORIZED CIRCUIT BREAKER NETWORK
Leon J. Mintz, Brooklyn, N.Y., and Roland Yii, West Chester, Pa., assignors to Burroughs Corporation, Detroit, Mich., a corporation of Michigan
Filed Nov. 19, 1958, Ser. No. 774,979
11 Claims. (Cl. 307—88.5)

This invention relates generally to an electrical overload protective network and more particularly to a quick acting transistorized circuit breaker network which can protect a regulated transistorized power supply from permanent damage due to the occurrence of a short in the load circuit.

Regulated transistorized power supply networks are simple in design, economical to build, and reliable in operation. Unfortunately, however, extraordinary care must be exercised to prevent the occurrence of a short in the load circuit as the large current drain through the power supply will frequently destroy the power transistor; even when the power supply is protected by a fuse.

Presently, fuses are utilized within regulated transistorized power supplies to protect the components from destruction due to an overload condition. However, a fuse will not operate or blow to interrupt the flow of current through a circuit unless exposed to an overload condition for a specific interval of time. This condition can be referred to as a thermal lag, the time required before the conductive fuse element reaches its melting point. Experience has shown that when an overload condition occurs, such as is caused by the presence of a short or partial short in a load circuit, the large current drawn will usually destroy the transistor before the fuse will "blow."

If the operating characteristics of the fuse element are modified by decreasing the time delay or thermal lag which must occur between the instant of occurrence of the overload condition and the blowing of the fuse, then the power transistor of a regulated transistorized power supply will be adequately protected if a short develops in the load circuit, but unfortunately, the fuse will blow and the circuit will become inoperative each time it is first activated by the initially occurring large transient condition.

It is a primary object of this invention to provide a device which can protect transistors from destruction due to overloading.

It is another object of this invention to provide a transistorized circuit breaker which can differentiate between an overload state caused by a short in the load circuit and a transient state which occurs when the circuit being protected is first activated.

It is still another object of this invention to provide a transistorized circuit breaker which is not self destructive, is economical to build, and is reliable in operation.

Figure 2:
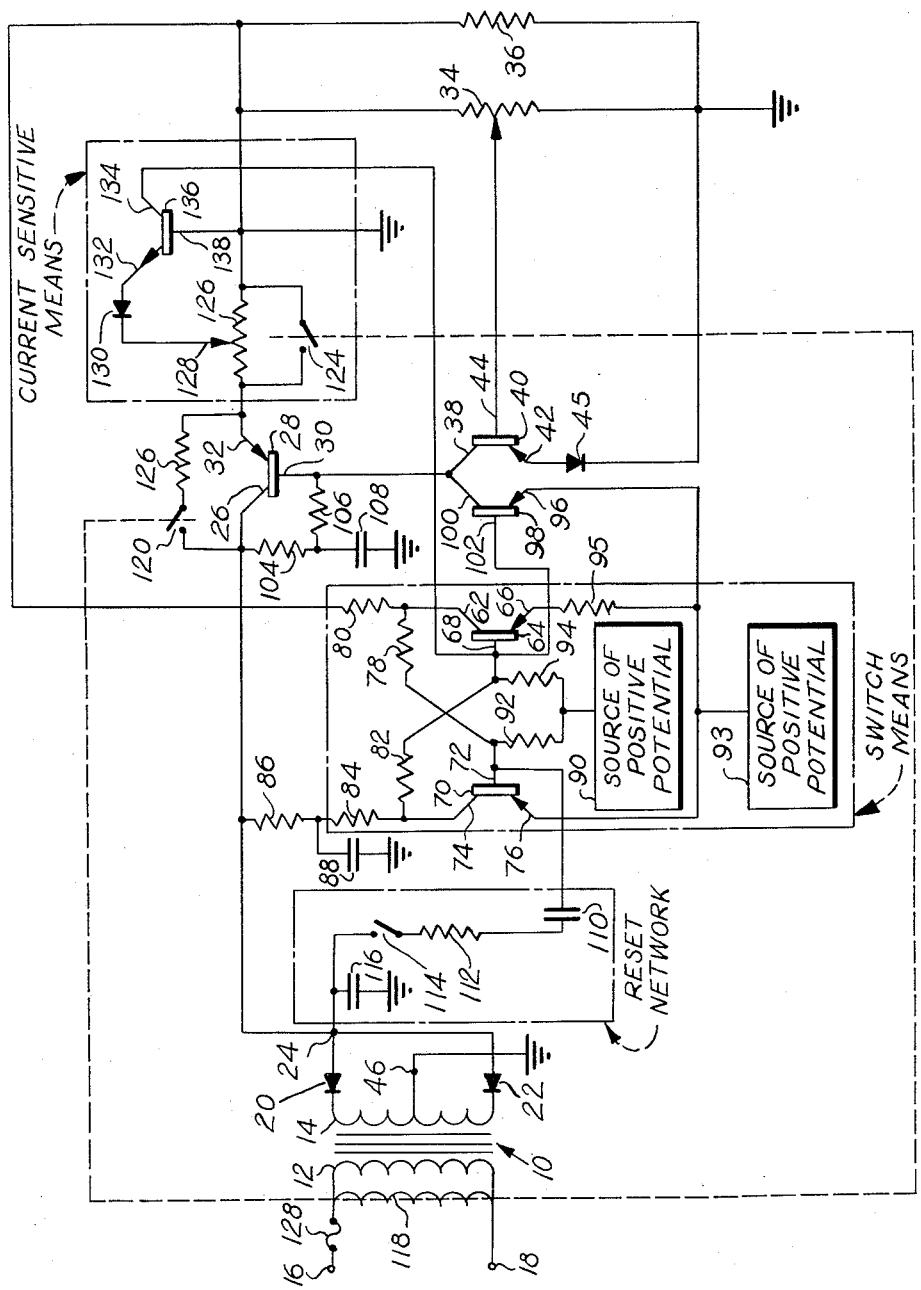
Figure 3:
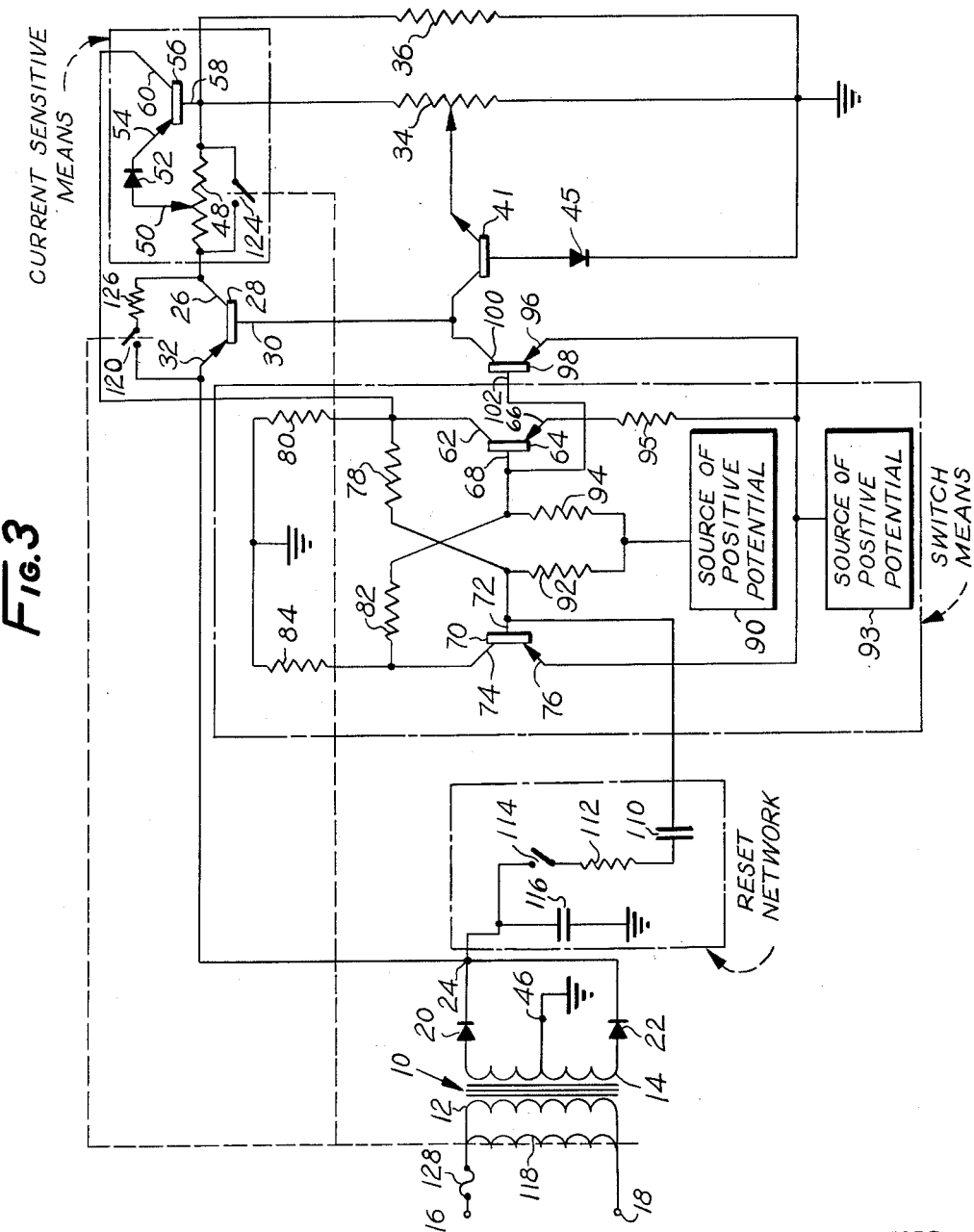

Other objects and many of the attendant advantages of this invention will be readily appreciated as the apparatus becomes better understood by reference to the following detailed description when considered in connection with the accompanying drawings wherein:

FIGS. 1 and 2 illustrate schematically two embodiments of a transistorized circuit breaker in accordance with the principles of this invention incorporated within a negative potential regulated transistorized power supply; and FIG. 3 is a schematic diagram of a positive potential regulated transistorized power supply incorporating a transistorized circuit breaker in accordance with the principles of this invention.

Similar reference characters refer to similar parts throughout the several views of the drawings.

Briefly, in a regulated transistorized power supply, the current fed to a load impedance is metered by a current sensitive means. The current sensitive means is preconditioned to change its state of conductivity abruptly when the current flowing through the load impedance exceeds a predetermined value. A quick-acting switch means, selectively activated by the current sensitive means, electrically decouples the regulated transistorized power supply from the load impedance when the current sensitive means changes its state of conductivity. If a bistable network is utilized as the quick acting switch means it will insure positive decoupling of the load impedance from the regulated transistorized power supply before permanent damage can be sustained by the transistors in the regulated power supply.

With reference to FIG. 1, there is illustrated in accordance with the principles of this invention a transistorized circuit breaker incorporated within a regulated transistorized power supply network. A transformer 10 supports a primary winding 12 and a center tapped secondary winding 14. The primary winding is connected to a source of A.C. potential through input terminals 16 and 18. A first crystal diode 20 is positioned between one end of the secondary winding 14 and a terminal 24, and another crystal diode 22 is positioned between the other end of the secondary winding 14 and terminal 24. In this figure, the diodes 20 and 22 are oriented to permit the passage of a negative potential signal to the terminal 24 relative to the potential signal on the center tapped terminal 46 of the secondary winding 14.

A power transistor 28 designated as a PNP type supports a collector terminal 26, an emitter terminal 32, and a base terminal 30. The collector terminal 26 is coupled to the terminal 24, the emitter terminal 32 is coupled to a ground terminal through a tapped reference resistor 34 positioned in shunt with the load impedance 36, and the base terminal 30 is connected to a collector terminal 38 of a transistor 40 designated as a PNP type. The transistor 40 also supports a base terminal 44 which is coupled to the sliding contact of a reference resistor 34; and an emitter terminal 42 which is coupled to a ground terminal through a source of reference potential or zener diode 45.

The two transistors 28 and 40, in combination with the source of reference potential 45 and tapped reference resistor 34 regulate the negative potential fed to the load impedance 36 from the terminal 24.

The center tapped terminal 46 of the secondary winding 14 is coupled to a ground terminal through a small impedance 48 which supports a sliding contact 50. A control transistor 56, illustrated as a PNP type supports an emitter terminal 54, a base terminal 58, and a collector terminal 60. The sliding contact 50 is coupled through a diode 52 to the emitter terminal 54. The base terminal 58 is connected to a ground terminal, and the collector terminal 60 is coupled directly to the collector terminal 62 of a transistor 64, designated as a PNP type, which also supports an emitter terminal 66 and a base terminal 68.

A transistor 70, designated as a PNP type supports a base terminal 72, a collector terminal 74, and an emitter terminal 76. The base terminal 72 is coupled through a resistor 78 to the collector terminal 62. The emitter terminal 32 of the power transistor 28 is coupled to the collector terminal 62 through a resistor 80.

The collector terminal 74 of transistor 70 is coupled through a resistor 82 to the base terminal 68, and to the terminal 24 through two resistors 84 and 86 connected in series. The junction terminal positioned between the two resistors 84 and 86 is coupled to a ground terminal through a capacitor 88. A source of positive potential 90 is coupled to the base terminal 72 through a resistor 92, and to the base terminal 68 through a resistor 94. The emitter terminal 76 is coupled to the emitter terminal 96 of a transistor 98 designated as a PNP type which also supports a collector terminal 100 and a base terminal 102. A source of positive potential 93 is coupled to feed a signal directly to the emitter terminals 76 and 96, and through an impedance 95 to the emitter terminal 66.

The collector terminal 100 is connected to the base terminal 30 of transistor 28; and the base terminal 102 is coupled to the base terminal 68 of transistor 64. The base terminal 30 is coupled to the collector terminal 26 through two resistors 104 and 106 connected in series. The junction of the two resistors 104 and 106 is coupled to a ground terminal through a capacitor 108. The base terminal 72 of transistor 70 is coupled to the terminal 24 through the series combination of a capacitor 110, a resistor 112, and a normally open switch 114. A capacitor 116 connected between the terminal 24 and a ground terminal. A relay winding 118 coupled across the primary winding 12 of the transformer 10 controls the operation of a pair of normally open contacts 120 positioned to deactivate the transistor 28 by shorting the collector terminal 26 to the emitter terminal 32.

In the operation of the network disclosed in FIG. 1, the transformer 10, the diodes 20, 22, and 45, the resistor 34, and the transistors 28, and 40 cooperate to provide a negative potential regulated transistorized power supply designed to maintain a constant value of voltage across the load impedance 36.

To protect the power transistor from an overload condition such as a short circuit in the load impedance, a current sensitive means, and a switch means is provided. The current sensitive means meters the current that flows through the load impedance. The switch means, when selectively activated by the current sensitive means disconnects the regulated transistorized power supply from the load impedance.

An examination of FIG. 1 will indicate that resistor 48, positioned between terminal 46 and a ground terminal, is in series with the load impedance. Therefore, since all the current which passes through the load impedance must also pass through the resistor 48, the magnitude of the current passed through the load impedance can be quickly and accurately determined at every instant by merely measuring the potential drop present across the resistor 48. The diode 52 and transistor 56 co-operates with the sliding contact 50 on the resistor 48 to feed a signal to the switch means when the potential which appears across the resistor 48 (and therefore the current drawn from the regulated transistorized power supply) exceeds a pedetermined safe limit.

The transistor 56 and the diode 52 are cut off during normal operation of the regulated transistorized power supply. However, if a short occurs in the load impedance 36 the current fed to the load impedance from the power supply will increase. The current through, and the voltage across the resistor 48 will also increase. When the current through the load impedance exceeds a specified value the voltage that appears between the sliding contact 50 and the ground terminal will increase to a value sufficient to permit the diode 52 and the transistor 56 to become conductive and feed a signal from the collector terminal 60 of transistor 56 to the collector terminal 62 of transistor 64. This signal activates the switch means to decouple the power supply from the load impedance.

The switch means illustrated is a transistorized bistable multivibrator formed by the transistors 64 and 70. During normal operation of the regulated transistorized power supply the transistor 64 is in a non-conductive state, and the transistor 70 is in a conductive state. Generation of a signal on the collector terminal 60 of transistor 56 triggers the bistable multivibrator to flip the transistor 64 to a conductive state and the transistor 70 to a non-conductive state. Transistor 98 is connected in parallel with transistor 64. Therefore, when the transistor 64 is switched to a conductive state, the transistor 98 is also switched to a conductive state.

The magnitude of the potential present on the collector 100 of transistor 98 approximates the magnitude of the signal from the source of positive potential 93 when the transistor 98 is in a fully conductive or saturated state, and is fed to the base terminal 30 of transistor 28 to drive it to a non-conductive or cut off state. In this manner a short circuited load impedance is electrically isolated from the regulated transistorized power supply, and the power transistor 28 is protected from destruction which would result from the passage of a large current.

The sliding contact 50 on the variable resistor 48 is positioned to receive and feed a signal having a magnitude sufficient to activate the diode 52 and the transistor 56 when the magnitude of the current which flows through the resistor (and, therefore, the load impedance 36) exceeds a preselected value. The ohmic value of the resistor is dependent upon the magnitude of the potential required to activate the diode 52 and the transistor 56, and also on the magnitude of the maximum allowable current that can be drawn by the load impedance. Generally, the resistor 48 will have a value in the order of one ohm.

Thus, the potential drop across the resistor 48 will be very small and will not affect the output potential of the regulated power supply. To insure rapid action of the current sensitive means the diode 52 and the transistor 56 should exhibit sharp turn-on characteristics. The diode 52 should be of the silicon type to present forward operating characteristics which will be substantially independent of variations in temperature. If variations in temperature adversely affects the forward characteristics of the transistor 56, then one or more diodes should be coupled in series with the diode 52. In this manner, variations in temperature will not affect adversely the forward characteristics of the transistor.

The normally opened switch 114 coupled in series with the resistor 112 and the capacitor 110 is used to manually reset the bistable multivibrator after the short in the load circuit has been removed.

The reset means resets the multivibrator by generating and feeding a sharp spike pulse signal to the base terminal 72 of transistor 70. Since only a sharp spike pulse signal is utilized to reset the multivibrator, the regulated transistorized power supply cannot be damaged if the switch 114 is accidently closed, and held closed before the defect in the load circuit has been corrected.

In this invention, as the impedance of the load decreases the magnitude of the load current increases. When the current fed to the load impedance approaches a predetermined maximum value the circuit breaker automatically decouples the regulated transistorized power supply from the load impedance before any of the components of the power supply can be destroyed by the large current drain. However, if the impedance of the load circuit was decreased suddenly to zero by the occurrence of a short circuit, then it would be possible that the collector voltage fed to the transistors might be reduced substantially to prevent the proper operation of the bistable multivibrator. To correct this condition the external collector resistance has been divided into two components represented by resistors 84 and 86. The capacitor 88 couples the junction of these two resistors with a ground terminal. Now, since the potential across a capacitor cannot be changed instantaneously the collector terminal of the transistor 70 will receive a potential adequate to insure its operation if a short circuit develops suddenly in the load circuit, and the multivibrator will respond to sudden shorts which develop in the load circuit to decouple immediately the load circuit from the regulated transistorized power supply.

The resistor 80 can be coupled between the collector terminal 62 of the transistor 64 and any one of several other points in the circuit that exhibit negative potential having an amplitude sufficient to be utilized as the collector supply potential. The removal of the collector supply potential from transistor 64 when a short circuit develops in the load circuit will not impede the operation of the bistable multivibrator.

The source of positive potential 93 fed to the emitter terminals of the transistors 70 and 64 is necessary to insure the cut off of the power transistor 28 when the transistor 98 is saturated.

Whenever the current fed to the load circuit exceeds a preselected value the transistorized circuit breaker is activated to decouple the regulated transistorized power supply from the load circuit. In many instances a large surge current will be fed to the load circuit when the power supply is first activated. This surge current, while larger in magnitude than the preselected value selected to initiate operation of the circuit breaker, will not damage the power supply. However, the circuit breaker network can only sense the magnitude of the current fed through the load circuit, it cannot determine the cause of a large current.

This being so, the large surge current which can occur each time the power supply is turned on will initiate activation of the circuit breaker network to decouple the power supply from the load circuit. The resistors 84, and 86, and the capacitor 88 corrects this situation by maintaining the transistor 70 in an inactive state until the regulated transistorized power supply reaches its steady state operating conditions. The capacitor 88 requires a certain duration of time to become charged through the resistor 86. Therefore, the bistable multivibrator is not activated when the power supply is first activated, but remains in a cut off state until the capacitor 88 is charged to a certain potential. The time required for the capacitor 88 to receive the desired change is adjusted to be slightly longer than the time required for the power supply to reach its steady state operating condition.

However, another special situation is created if the bistable multivibrator is in a deactivated state when the power supply is first turned on. For example, if a short is present in the load circuit before the power supply is energized, then when the regulated transistorized power supply is energized it will be damaged by the large current it is required to pass during that interval of time between the activation of the regulated transistorized power supply and the activation of the bistable multivibrator.

This special situation can be corrected by coupling a pair of normally closed relay contact points 120 between the collector terminal 26 and the emitter terminal 32 of the transistor 28, and by coupling the winding of the relay across the primary winding 12 of the transformer 10. In operation, the operating time delay of the relay prevents the relay contacts 120 from opening for a few milliseconds immediately after the regulated transistorized power supply is first activated. This time interval is sufficient to protect the transistor 28 by providing a very low resistance path around the transistor 28 until the capacitor 88 charges to a desired value to permit the transistor 70 to become activated.

Occasionally, a surge current condition will be created when the regulated transistorized power supply is first energized. The surge current, when sensed by the resistor 48 will appear as an overload condition and decouple the power supply from the load.

A second set of normally closed relay contacts 124 activated by the relay winding 118 are connected across the resistor 48. These contacts provide a short circuit path across the resistor 48 to prevent the generation of a trigger potential by the surge current. In this manner the surge current cannot trigger the multivibrator which, in turn, would decouple the power supply from the load. Thus, the trigger potential used to change the state of the multivibrator is eliminated temporarily. The characteristics of the relay selected determine the time delay between the energization of the power supply and the opening of the two sets of contacts 120 and 124 to allow the power supply to operate normally. A small resistor 126 should be added in series with the relay contacts 120 to protect the rectifier diodes when the flow of current bypasses the transistor 28 by limiting the maximum current that can be drawn.

Naturally, the entire system should also be protected by a fuse 128 coupled in series with the primary winding 12 of the transformer 10.

The position of the resistor 48 and the transisor 56 is not restricted to the position shown in FIG. 1, but can be located anywhere in the circuit where the load current flows and the transistor collector junction can be biased properly.

With reference to FIG. 2, there is shown a negative power supply which utilizes an NPN transistor instead of a PNP transistor in the current sensitive means. Since FIG. 2 is identical to FIG. 1, except for the type and position of the transistor which forms a portion of the current sensitive means, only the current sensitive means will be referred to in detail. The emitter terminal 32 of transistor 28 is coupled through a resistor 126 which supports a sliding contact 128 to the base terminal 138 of an NPN transistor 136, and then to the resistor 34, and load impedance 36. The emitter terminal 132 of the transistor 136 is coupled to the sliding contact 128 through a diode 130; and the collector terminal 134 is coupled to the base terminal 68 of transistor 64. The operation of the structure of FIG. 2 is the same as the operation of the structure of FIG. 1 described previously.

With reference to FIG. 3, there is illustrated a circuit breaker for utilization with a regulated transistorized power supply which furnishes an output signal having a positive potential. The slight differences apparent in the arrangement of the components of the regulated transistorized power supply of FIG. 3 over the arrangement of the components of the regulated transistorized power supplies of FIGS. 1 and 2 is necessary due to the fact that the power supply of FIG. 3 delivers a positive potential at its output terminals while the power supplies of FIGS. 1 and 2 deliver negative potentials at their output terminals. In this embodiment, the resistor 86 and capacitor 88 is eliminated, the upper terminals of the resistors 84 and 80 are coupled to a ground terminal, and the current sensitive means is interposed between the transistor 28 and the load impedance 36. The collector terminal 26 of transistor 28 is coupled through the resistor 48 to the load impedance 36 and to the base terminal 58 of transistor 56. It should also be noted that transistor 40 of the PNP type has been replaced with a transistor 41 designated as the NPN type and connected as shown. In this embodiment the magnitude of the source of positive potential 93 must be greater than the magnitude of the source of positive potential 90. The sliding contact 50 of the resistor 48 is coupled through the diode 52 to the emitter terminal 54 of the transistor 56; and the collector terminal 60 of the transistor 56 is coupled to the collector terminal 62 of transistor 64.

The slight variations in the arrangement of the components of the circuit breaker and the regulated transistorized power supply illustrated in FIG. 3 over that illustrated in FIG. 1 exists because the embodiment of FIG. 3 supplies a positive potential while the embodiment of FIG. 1 supplies a negative potential. However, in operation, the structure of FIG. 3 performs in a manner similar to the operation of the structure of FIG. 1 described previously in detail.

With reference to FIGS. 1, 2, and 3, if the switch network or means is altered by substituting a monostable multivibrator for the bistable multivibrator, then the reset network can be eliminated. In this embodiment, if a short circuit occurs in the load impedance the monostable multivibrator will flip from its stable state to its quasi-stable state, and decouple the load impedance from the power supply. After a short interval of time the multivibrator will automatically reset itself by flopping back to its stable state, and again couple the load impedance to the power supply. If the short circuit is still present, the current through the load impedance will increase rapidly and the multivibrator will again flip to its quasi-stable state and again decouple the load impedance from the power supply.

Thus, as long as the load is short circuited the multivibrator will continue to oscillate, and alternately couple and decouple the load impedance to and from the power supply to limit the average power dissipated in the power transistor to a safe value.

Obviously, many modifications and variation of the present invention are possible in the light of the above teachings. It is therefore to be understood that within the scope of the appended claims the invention may be practiced otherwise than as specifically described.

What is claimed is:

1. In a transistorized power supply which feeds regulated voltage to a load impedance, a transistorized circuit breaker comprising a resistor coupled to meter the current fed to the load impedance, a first transistor coupled to change its state of conductivity when the current through the resistor exceeds a preselected value, a diode interposed between said resistor and said first transistor, second and third transistors coupled together to form a multivibrator coupled to said transistorized power supply and fed by said first transistor to decouple said transistorized power supply from said load impedance when the metered current exceeds a preselected value, and a resistor-capacitor reset network coupled to said multivibrator.

2. In a transistorized power supply which feeds regulated voltage to a load impedance, a transistorized circuit breaker comprising a resistor coupled to meter the current fed to the load impedance, a transistor coupled to change its state of conductivity when the current through the resistor exceeds a preselected value, a diode interposed between said resistor and said transistor, shorting means coupled to short said resistor for a preselected interval of time when the transistorized power supply is first activated, a bistable multivibrator coupled to said transistorized power supply and fed by said transistor to decouple said transistorized power supply from said load impedance when the metered current exceeds a preselected value, and reset means coupled to said bistable multivibrator.

3. In a transistorized power supply which feeds regulated voltage to a load impedance, a transistorized circuit breaker comprising a resistor coupled to meter the current fed to the load impedance, a first transistor coupled to change its state of conductivity when the current through the resistor exceeds a preselected value, a diode interposed between said resistor and said first transistor, shorting means coupled to short said resistor for a preselected interval of time when the transistorized power supply is first activated, second and third transistors coupled together to form a multivibrator coupled to said transistorized power supply and fed by said first transistor to decouple said transistorized power supply from said load impedance when the metered current exceeds a preselected value, and a resistor-capacitor reset network coupled to said multivibrator.

4. In a transisorized power supply which feeds regulated voltage from a power transistor to a load impedance, a transistorized circuit breaker comprising shorting means coupled to short the power transistor for a preselected interval of time when the transistorized power supply is first activated, a resistor coupled to meter the current fed to the load impedance, a transistor coupled to change its state of conductivity when the current through the resistor exceeds a preselected value, a diode interposed between said resistor and said transistor, a bistable multivibrator coupled to said transistorized power supply and fed by said transistor to decouple said transistorized power supply from said load impedance when the metered current exceeds a preselected value, and reset means coupled to said bistabie multivibrator.

5. In a transistorized power supply which feeds regulated voltage from a power transistor to a load impedance, a transistorized circuit breaker comprising shorting means coupled to short the power transistor for a preselected interval of time when the transistorized power supply is first activated, a resistor coupled to meter the current fed to the load impedance, a first transistor coupled to change its state of conductivity when the current through the resistor exceeds a preselected value, a diode interposed between said resistor and said first transistor, second and third transistors coupled together to form a multivibrator coupled to said transistorized power supply and fed by said first transistor to decouple said transistorized power supply from said load impedance when the metered current exceeds a preselected value, and a resistor-capacitor reset network coupled to said multivibrator.

6. In a transistorized power supply which feeds regulated voltage from a power transistor to a load impedance, a transistorized circuit breaker comprising first shorting means coupled to short the power transistor for a preselected interval of time when the transistorized power supply is first activated, a resistor coupled to meter the current fed to the load impedance, a first transistor coupled to change its state of conductivity when the current through the resistor exceeds a preselected value, a diode interposed between said resistor and said first transistor, a second shorting means coupled to short said resistor for a preselected interval of time when the transistorized power supply is first activated, a bistable multivibrator coupled to said transistorized power supply and fed by said first transistor to decouple said transistorized power supply from said load impedance when the metered current exceeds a preselected value, and reset means coupled to said bistable multivibrator.

7. In a transistorized power supply which feeds regulated voltage from a power transistor to a load impedance, a transistorized circuit breaker comprising first shorting means coupled to short the power transistor for a preselected interval of time when the transistorized power supply is first activated, a resistor coupled to meter the current fed to the load impedance, a first transistor coupled to change its state of conductivity when the current through the resistor exceeds a preselected value, a diode interposed between said resistor and said first transistor, second shorting means coupled to short said resistor for a preselected interval of time when the transistorized power supply is first activated, a second and third transistors coupled together to form a multivibrator coupled to said transistorized power supply and fed by said first transistor to decouple said transistorized power supply from said load impedance when the metered current exceeds a preselected value, and a resistor-capacitor reset network coupled to said multivibrator.

8. In a transistorized power supply which feeds regulated voltage from a power transistor to a load impedance, a circuit breaker comprising a resistor coupled to meter the current fed to the load impedance, a first transistor coupled to change its state of conductivity when the current through the resistor exceeds a preselected value, a diode interposed between said resistor and said first transistor, a first set of normally closed relay contacts coupled to short said power transistor, a second set of normally closed relay contacts coupled to short said resistor, a relay winding energized when the transistorized power supply is energized coupled to open said first and second sets of normally closed relay contacts after a predetermined time delay, a bistable multivibrator coupled to said transistorized power supply and fed by said first transistor to decouple said transistorized power supply from said load impedance when the metered current exceeds a preselected value, and reset means coupled to said bistable multivibrator.

9. In a transistorized power supply which feeds regulated voltage from a power transistor to a load impedance, a circuit breaker comprising a resistor coupled to meter the current fed to the load impedance, a first transistor coupled to change its state of conductivity when the current through the resistor exceeds a preselected value, a diode interposed between said resistor and said first transistor, a first set of normally closed relay contacts coupled to short said power transistor, a second set of normally closed relay contacts coupled to short said resistor, a relay winding energized when the transistorized power supply is energized and coupled to open said first and second sets of normally closed relay contacts after a predetermined time delay, second and third transistors coupled together to form a multivibrator coupled to said transistorized power supply and fed by said first transistor to decouple said transistorized power supply from said load impedance when the metered current exceeds a preselected value, and a resistor-capacitor reset network coupled to said multivibrator.

10. A power supply for a load, comprising, a power transistor connected to said load, an impedance element connected in series with said power transistor for producing a voltage drop across said impedance element in accordance with the current through said power transistor, a control transistor coupled to said impedance element to change its state of conductivity when the current through said impedance element exceeds a preselected value, a multivibrator coupled to said control transistor and adapted when actuated to decouple said power transistor from said load, and means for actuating said multivibrator when the conductivity of said control transistor is changed by the passage of a current through said impedance element exceeding said preselected value.

11. A power supply for a load, comprising, a power transistor connected to said load, an impedance element connected in series with said power transistor for producing a voltage drop across said impedance element in accordance with the current through said power transistor, a control transistor coupled to said impedance element to change its state of conductivity when the current through said impedance element exceeds a preselected value, a multivibrator coupled to said control transistor and adapted when actuated to decouple said power transistor from said load, means for actuating said multivibrator when the conductivity of said control transistor is changed by the passage of a current through said impedance element exceeding said preselected value, a resistor-capacitor network for generating a reset pulse, and means for applying said reset pulse to said multivibrator to recouple said power transistor to said load.

References Cited in the file of this patent
UNITED STATES PATENTS

| | | |
|---|---|---|
| 2,776,382 | Jensen | Jan. 1, 1957 |
| 2,832,900 | Ford | Apr. 29, 1958 |
| 2,969,498 | Stenudd | Jan. 24, 1961 |

OTHER REFERENCES

Publication: "Transistor Power Supply," Electronics, June 20, 1958.